United States Patent [19]
Mastandrea

[11] Patent Number: 5,107,699
[45] Date of Patent: Apr. 28, 1992

[54] AREA CONVERTER FOR VOLUMETRIC LEAK DETECTOR

[75] Inventor: John R. Mastandrea, Redondo Beach, Calif.

[73] Assignee: NDE Environmental Corporation, Torrance, Calif.

[21] Appl. No.: 371,991

[22] Filed: Jun. 27, 1989

[51] Int. Cl.⁵ .............................. G01M 3/32
[52] U.S. Cl. .......................... 73/49.2; 73/302
[58] Field of Search .................. 73/49.2, 302

[56] References Cited

U.S. PATENT DOCUMENTS

| | | | |
|---|---|---|---|
| 4,474,054 | 10/1984 | Ainlay | 73/49.2 |
| 4,561,291 | 12/1985 | Ainlay | 73/49.2 |
| 4,807,464 | 12/1989 | Jannotta | 73/49.2 |
| 4,945,757 | 8/1990 | Schuster | 73/49.2 |

FOREIGN PATENT DOCUMENTS

| | | | |
|---|---|---|---|
| 1070421 | 2/1954 | France | 73/302 |
| 119015 | 9/1980 | Japan | 73/302 |

*Primary Examiner*—Hezron E. Williams
*Assistant Examiner*—Joseph W. Roskos
*Attorney, Agent, or Firm*—Owen, Wickersham & Erickson

[57] ABSTRACT

A volumetric leak detector. An overfilled storage tank has at its upper end a fill pipe predetermined surface area. An area converter reservoir is connected at this upper end with the storage tank, so that some liquid from the fill pipe flows into the reservoir. The area converter reservoir has a surface area which is larger than the surface area of the fill pipe. An almost constant minimum level is provided in the area converter reservoir, and the height difference between that minimal level and the actual level of the tank are as determined.

5 Claims, 1 Drawing Sheet

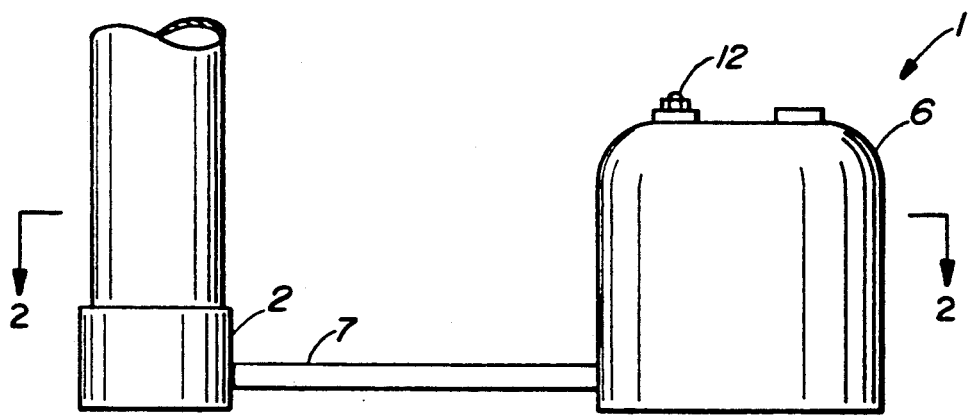
FIG._1
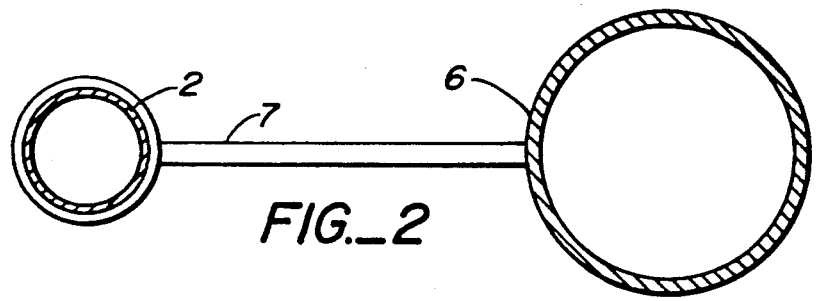
FIG._2
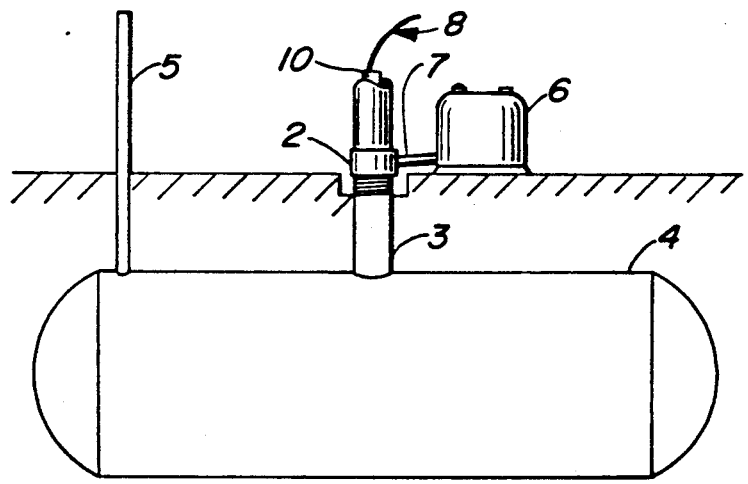
FIG._3
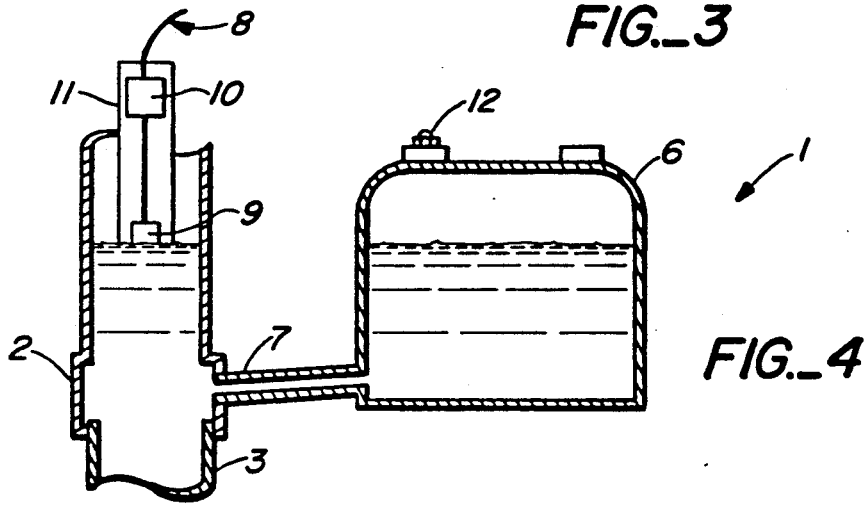
FIG._4

AREA CONVERTER FOR VOLUMETRIC LEAK DETECTOR

This invention relates to a device for improving the accuracy of volumetric leak detectors.

BACKGROUND OF THE INVENTION

Volumetric leak detectors and detection systems are employed with underground storage tanks and other tanks. These systems in many instances employ measurement of the change in liquid level in order to determine the leak rate. Such systems are employed with overfilled tanks as well as underfilled or partially filled tanks.

These systems are used with many different types of liquids. Many of these tanks, especially the underground storage tanks, are used for storing petroleum products, including gasoline. However, they may be used with various chemicals and also for storing water.

Many such tanks and the piping to them have been found to leak. Some current estimates indicate that between 1% and 5% of such tanks leak. Leaking tanks and leaking piping connected to such tanks contaminate the ground water and cause other types of environmental pollution. They also become health and safety hazards.

Recently, the public has expressed much more concern, because the testing methods heretofore used for measuring the amount of leakage from such tanks have been found in many instances to be seriously inaccurate. One of the main sources of errors in the amount of leakage has been due to tank deflection, which occurs during a tank test when there are significant changes in the level. For example, liquid level changes of one centimeter during a test can cause a measurement error of 0.02 gallons or more. Larger liquid level movements result in errors that are correspondingly larger.

Tank testing systems that attempt to maintain a constant liquid level (typically +/−0.1") during a tank test have been developed. Such constant level systems are limited in accuracy by the limitations in their ability to maintain a constant level, since typical systems are capable of maintaining a liquid level only within an amount of +/−0.1". Further, some such systems affect the temperature profile in the tank because of a need to add or remove liquid (usually at a different temperature) in order to maintain the constant level. Temperature profile changes also cause increases in errors related to the temperatures of the liquid in the tank.

Other constant level systems require insertion of a bar that is raised or lowered to maintain the desired constant level. Such systems are seriously affected by vibration, which may be caused by external effects such as wind or highway traffic. Constant-level measurement systems also limit the sampling period, because of practical problems in maintaining the constant level. Constant-level systems heretofore in use are also cumbersome, complicated to operate, and tend to require considerable maintenance.

An example of a method that uses constant level to maintain measurement of leak rate is shown in the Hasselman U.S. Pat. No. 4,672,842 issued June, 1987. The Hasselman system maintains a constant level by using a liquid reservoir container and a pump system that adds or removes liquid, depending upon the output of the liquid level measurement sensor.

There are many significant inaccuracies in other systems, and there are limitations in those systems that require the measurement of liquid level and of changes therein, in order to determine the leakage rate.

The problem of the dynamic effect of tank liquid level movement was not well understood until some findings were reported in the literature on Nov. 7, 1988 by Vista Research, Inc. The work was carried out under contract by the U.S. Environmental Protection Agency, Inc. and published in a report entitled "Evaluation of Volumetric Leak Detection Methods for Underground Storage Tanks" Vol 1, E.P.A. Contract No. 68-03-3409.

Table 8.14 of the report showed that a height change of 10 cm (3.93 inches) resulted in a volume change of 300 ml (0.078 gallons), which is an error of about 30 ml (0.0078 gallons) for each centimeter (0.39 inches) of liquid level change; this is about 0.02 gallons/inch change.

The average cross-section area of the piping in an overfill precision tank test with typical piping is about 58 square inches For a 0.1° F. per hour change in an 8,000 gallon tank filled with gasoline, the volume change is 0.5 gallons and results in a liquid level change of about 2 inches. This results in a volume error of 0.04 gallons.

SUMMARY OF THE INVENTION

The invention solves many problems of preventing errors or of compensating for such errors, due to tank deflection caused by liquid level movement up or down during a volumetric precision tank test. It also overcomes some of the practical limitations and errors resulting from methods that use constant liquid level in order to minimize tank deflection errors.

The invention improve the accuracy of volumetric leak detection by increasing the horizontal surface area of the liquid at the liquid level measurement location. It does this by the addition of an area converter, which is the key element in this invention. The invention produces an almost constant hydrostatic pressure and therefore a substantially constant liquid level during a tank test.

Error can, be reduced significantly by increasing the surface area of the liquid such that the liquid level change in a full pipe of a tank, for example due to thermal expansion of liquid in the tank, is much smaller. For example, by adding a reservoir with a cross-sectional area of 116 inches square, twice the cross sectional area of a typical fill pipe, the error due to tank deflection can be reduced by a factor of three or to 0.013 gallon. By increasing the cross-sectional area further, the error is correspondingly decreased.

In order to achieve the error reduction in practice, the liquid level must be measured to a high resolution, i e., typically to better than 0.001 inch. Such accuracy can be achieved by an accurate liquid level measuring system, such as a Linear Variable Displacement Transducer or LVDT. Such a pressure transducer is employed in my co-pending patent application, Ser. No. 122,204, filed Nov. 18, 1987, now U.S. Pat. No. 4,852,054. There are also constant level systems employing optics; for example, lasers or fiber optics, and there are systems using other methods, including acoustic liquid level measuring systems.

The area converter of this invention comprises a reservoir of large surface area connected to the top of an overfilled tank to increase the surface area of the product in the tank. The total liquid surface area includes the increased surface area of the liquid product, which is provided by the area converter reservoir in addition to the existing fluid surface area in the tank piping system, which includes fill tubes, vent pipes, field lines, vapor recovery lines and continuous monitoring lines. The test is conducted while the product surface area is within this reservoir. The area converter is used to maintain an almost constant liquid level, typically +/−0.05" during a volumetric leak detection test in the tank.

The reservoir of the area converter is normally connected by a large diameter flexible hose to ports on the upper end of the tank or to piping on top of the tank. When the area converter is in use, the product level is normally slightly above grade; however, it can also be raised arbitrarily to any height specified by the tank owner. Such an increase may be desirable for example, if the ground water level is high.

The increased product surface area obtained by using the reservoir of the area converter of this invention produces a more accurate estimate of the height-to-volume conversion factor. If the product-level measurements are made in a standpipe of small diameter in which no re-leveling is done in order to keep a nearly constant hydrostatic pressure in the tank during a test, the height-to-volume conversion factor, which is estimated by inserting and removing a calibration bar of known volume (i e., $A_{eff}$) will be in error. The $A_{eff}$ includes the effects of the volume changes produced by instantaneous deformation of the height-to-volume conversion factor, that is, $A_{eff}+K$. The valve of K must also include the long term time-dependent effects of the structural results; where K is an actual field-test figure.

K should be small compared to $A_{eff}$. However, the best practical method to make sure that the effects of deformation are minimal is to increase the $A_{eff}$. This is readily accomplished by an increase of the product surface area by this invention. If K is very small compared to $A_{eff}$ the hydrostatic pressures will be nearly constant during a test, and re-leveling will not be required. Thus, the area converter of this invention increases the surface area of the liquid test level, so that the tank deflection error during a tank test is substantially eliminated.

BRIEF DESCRIPTION OF THE DRAWINGS

FIG. 1 is an overall schematic view of an apparatus embodying the principles of the invention and enabling practice of the method of the invention.

FIG. 2 shows a top view of the area converter shown in FIG. 1

FIG. 3 shows the apparatus installed on an overfilled tank.

FIG. 4 provides a side view of the cross section of the area converter shown in FIG. 3.

DESCRIPTION OF A PREFERRED EMBODIMENT OF THE INVENTION

An assembly 1, as shown in FIG. 1, may be installed at the top of a fill pipe 2 connected to an upper end 3 of a tank 4 (shown in FIG. 3). Or as shown in FIG. 4, a reservoir 6 of an assembly 1 in FIG. 1 may be connected to the pipe 2 through a hose 7. Normally a 12-inch-diameter 5-gallon capacity safety container 6 is provided with a small bleed vent 12. The reservoir 6 is normally connected to a large diameter hose 7, for example 0.75 inch diameter, which is connected near the lower end of the fill pipe 2 connected to the upper end of fill pipe 3 of a tank 4, or is otherwise connected to the top of the tank 4 or some piping attached to the top of the tank 4. The hose 7 is nominally 3 feet long, but its length may be increased by adding sections of hose. Such an increase is necessary, for example, in order to conduct tests at an elevated level. The tank 4 also has a vent pipe 5.

In a typical storage tank the piping including the fill pipe may have a surface area of around 58 square inches. For a 0.1° F. per hour temperature change in a tank filled with gasoline, the volume change is 0.5 gallons and results in a liquid level change of about two inches in the fill pipe. Due to tank deflection caused by this level rise a volume error of 0.04 gallons occurs. However, using the reservoir 6, having a typical surface area of around 116 square inches, the error due to tank deflection can be reduced by a factor of three, or to 0.013 gallons. Further increases in the reservoir surface area will provide a corresponding reduction in volume error during tank testing.

Under certain conditions, the diameter of the area converter 1 should be increased. For example, the reservoir 6 may be increased to a diameter of approximately 3 feet by using both reservoirs as a gasoline storage barrel. Such a larger reservoir 6 may be used when the product-volume change associated with temperature-volume change is large enough to preclude the use of a reservoir In using the assembly 1 according to the invention, the variation in liquid level in the fill pipe 3 is measured by any suitable liquid level detector 8, such as shown in FIGS. 4 and 9 of the aforesaid U.S. Pat. No. 4,852,054. As described in detail therein, the detector 8 comprises a float 9 connected to a linear variable displacement transducer (LVDT) 10 normally contained in a liquid level monitoring tube 11. The level detector 8 provides an output directly related to a base liquid level so that the change in level can be readily measured. Other liquid level devices well known in the art could also be used.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A volumetric leak detector comprising:
   an overfilled storage tank having at its upper end a fill pipe with a predetermined cross-sectional surface area,
   an area converter reservoir connected at said upper end with said fill pipe, so that some liquid from said fill pipe flows into said reservoir and the liquid in said reservoir has the same height as the liquid in the fill pipe.
   said area converter reservoir having a cross-sectional surface area which is larger than said predetermined cross-sectional surface area of said fill pipe,
   conduit means extending between said reservoir and said fill pipe for providing an almost constant minimum level in said area converter reservoir and said fill pipe and
   liquid level sensor means for determining the height difference in said fill pipe between said minimal level and the actual level of said tank.

2. The leak detection of claim 1 wherein said area converter reservoir is connected to said fill pipe by a flexible hose or piping.

3. The leak detector of claim 1 wherein said reservoir has a surface area at least twice as great as said fill pipe.

4. The leak detector of claim 1 wherein said conduit means is a tubular member extending substantially horizontally from said fill pipe to said reservoir near its lower end thereby allowing the liquid in said reservoir to be maintained at the same level as the liquid in said fill pipe.

5. A method for improving the accuracy of a volumetric leak detector, comprising:

providing a storage tank with an upper end having a fill pipe of predetermined cross-sectional surface area, connecting to the fill pipe a reservoir with a cross-sectional surface area that is larger than said predetermined cross-sectional surface area of the fill pipe and in a manner such that liquid in said fill pipe will have the same height as liquid in said reservoir and the total surface area covered by liquid at the same height is increased, overfilling said storage tank to place liquid into said fill pipe and into said reservoir at a predetermined height, and determining the difference between the actual level in said area converter reservoir and said predetermined height.

* * * * *